(12) United States Patent
Barr et al.

(10) Patent No.: US 12,184,802 B2
(45) Date of Patent: Dec. 31, 2024

(54) SYSTEMS AND METHODS FOR DISTRIBUTING CRYPTOGRAPHIC RESOURCES UPON DETERMINATION OF AN IRREGULARITY THROUGH SELF-EXECUTING CODE

(71) Applicant: Capital One Services, LLC, McLean, VA (US)

(72) Inventors: Brian Barr, Schenectady, NY (US); Austin Walters, Savoy, IL (US); Jeremy Goodsitt, Champaign, IL (US); Samuel Sharpe, Cambridge, MA (US); Kenny Bean, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 240 days.

(21) Appl. No.: 17/978,543

(22) Filed: Nov. 1, 2022

(65) Prior Publication Data
US 2024/0146550 A1    May 2, 2024

(51) Int. Cl.
*H04L 9/00* (2022.01)
*H04L 9/08* (2006.01)
*H04L 9/30* (2006.01)
*H04L 9/40* (2022.01)

(52) U.S. Cl.
CPC .............. *H04L 9/50* (2022.05); *H04L 9/0894* (2013.01); *H04L 9/30* (2013.01); *H04L 63/0428* (2013.01)

(58) Field of Classification Search
CPC . H04L 9/50; H04L 9/0894; H04L 9/30; H04L 63/0428
USPC ........................................... 713/162; 709/224
See application file for complete search history.

(56) References Cited

U.S. PATENT DOCUMENTS

| | | | |
|---|---|---|---|
| 2016/0012465 A1* | 1/2016 | Sharp ................... | G06Q 20/321 705/14.17 |
| 2018/0216946 A1* | 8/2018 | Gueye ................ | G01C 21/3617 |
| 2022/0182222 A1* | 6/2022 | Wei ........................ | H04L 9/0894 |
| 2022/0384027 A1* | 12/2022 | Kaleal, III ............... | A61B 5/11 |
| 2022/0404949 A1* | 12/2022 | Berquam ................ | G06F 3/011 |
| 2023/0173395 A1* | 6/2023 | Cella ..................... | G06N 3/0475 463/25 |

* cited by examiner

*Primary Examiner* — Liangche A Wang
(74) *Attorney, Agent, or Firm* — Foley & Lardner LLP

(57) ABSTRACT

The invention relates to executing an action for a cryptographic storage application by comparing a movement dataset, which may contain positional and inertial datasets, with a user profile dataset. The system may receive a first cryptographic storage application address, retrieve a first movement dataset corresponding to a first time period, retrieve a user profile dataset, compare the first movement dataset with the user profile dataset, and execute an action for the first cryptographic storage application.

20 Claims, 4 Drawing Sheets

SYSTEMS AND METHODS FOR DISTRIBUTING CRYPTOGRAPHIC RESOURCES UPON DETERMINATION OF AN IRREGULARITY THROUGH SELF-EXECUTING CODE

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology such as a public ledger, use of digital wallets, and immutable transactions, may be seen negatively by users that wish to maintain privacy of transactions, wish to know the true identities of users involved in transactions, and wish to reverse unauthorized transactions, respectively. These technical problems present an inherent problem with attempting to use a blockchain technology-based solution in securely redistributing cryptographic wealth automatically in the event that the owner is incapable of doing so due to a catastrophe.

SUMMARY

Methods and systems are described herein for novel uses and/or improvements to blockchain technology. As one example, methods and systems are described herein for allowing access to cryptographic resources that are otherwise only accessible to, for example, controllers of cryptographic wallets, in response to detecting circumstances where a wallet controller is incapacitated, such as in an emergency.

Existing applications for storing cryptographic wealth, such as wallets, allow for secure access only to holders of the wallet private key, required for any cryptocurrency transactions. For example, where in conventional banking, in the event of a disaster or event where an account holder is incapacitated, there are legal and procedural backstops to allow funds to be accessed by, for example, executors or family members of the account holder. With the proliferation of cryptoassets, however, access to another entity's funds is less clear. Losing access to the private key associated with a wallet (e.g., via the incapacitation of the cryptowallet holder) night render the assets permanently lost, To further exacerbate this problem, current cryptowallets and other cryptographic storage applications do not interface with external data off-chain data in a way that makes it possible for a cryptographic storage application to determine when a wallet holder may be incapacitated. Thus, determining an irregular event presents a significant challenge, particularly if this determination triggers one or more blockchain-related action (e.g., as the blockchain-related action may be irreversible).

To overcome these technical deficiencies in adapting blockchain technology for this practical benefit, methods and systems disclosed herein mitigate the potential for loss of cryptoassets in the event a cryptowallet holder is incapacitated. In particular, the methods and systems recite a mechanism for automatically distributing cryptographic resources in response to the determination of an irregular event (e.g., the death or incapacitation of a user). To do so, the methods and systems present an unconventional mechanism for both detecting the irregular events as well as automatically distributing cryptographic resources in response. In particular, the methods and systems interface with a device's movement data, as well as a user's profile, in order to determine criteria for when a holder of a cryptographic storage application may be in an emergency situation, and allows actions based on this determination. For example, the system works by retrieving a movement dataset, which may include global positioning system coordinate data and inertial measurement unit data, in order to detect when there is an irregularity when compared to a user's normal position and acceleration behavior.

The system may then leverage self-executing code (e.g., as found in a smart contract) to execute an action, such as transferring funds out of one wallet to a beneficiary, in order to protect the cryptographic assets under distressing situations. Accordingly, the methods and systems allow users to determine conditions for moving cryptoassets to safety and to correspondingly mitigate the risk of losing these assets, where in conventional cryptographic systems, the assets may become permanently inaccessible.

In some aspects, the system may receive, at a first device in a computer network, a first cryptographic storage application address, wherein the first device comprises a self-executing code, wherein the first cryptographic storage application address corresponds to a first cryptographic storage application, and wherein the first cryptographic storage application enables access to a first cryptographic resource. The system may retrieve, at a first device, a first movement dataset corresponding to a first time period, wherein the first movement dataset comprises a first locational dataset and a first inertial dataset. The system may retrieve, at the first device, a user profile dataset. The system may compare the first movement dataset with the user profile dataset. In response to comparing the first movement dataset with the user profile dataset, the system may execute an action for the first cryptographic storage application via the self-executing code.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention, it will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
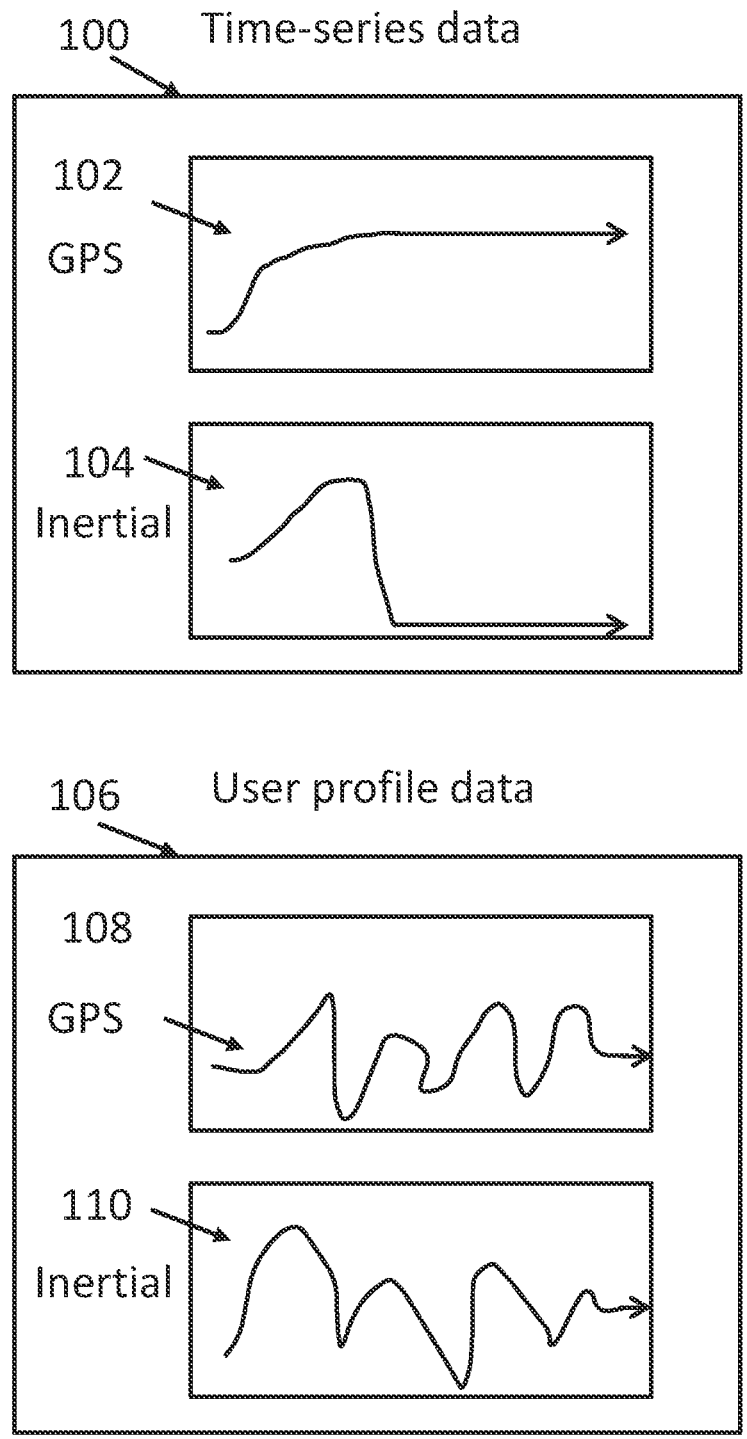
FIG. 1 shows an illustrative diagram for time-series data and user profile data retrieved by the system, in accordance with one or more embodiments.

FIG. 1 shows an illustrative diagram for time-series data and user profile data retrieved by the system, in accordance with one or more embodiments. For example, movement dataset 100 may correspond to tracked data arising from a user's mobile device data, where the dataset comprises time-series data for both GPS coordinates 102 and inertial measurement unit data 104, for example. On the other hand, the system may also rely on user profile data 106 as the basis for comparison with mobile device data, in order to determine whether an irregularity occurred and, subsequently, whether an action should be taken with the cryptographic assets owned by the user. For example, FIG. 1 illustrates GPS coordinate data, which may include latitude and longitude information, tracked over time for a user, in order to acquire a complete picture as to a device user's movements, in addition to inertial measurement data over time, which indicates the acceleration, both linear and rotational, that a user is undergoing over time. For example, by comparing this movement-based data, founded on positional and inertial data, with a user's longer-term behavior, as represented in the user profile data, the system may make a determination as to how to handle the user's cryptographic assets in case of any detected irregularities. In the illustrated example in FIG. 1, it is clear that the GPS and inertial time-series data, 102 and 104 respectively, differ in their volatility (e.g., the two sets of data differ based on mean-squared errors compared to the average data) with respect to a user's normal GPS data and inertial data, represented in the user profile data 108 and 110 respectively. Volatility in a GPS signal is usually an indication that the signal is not being tampered with, and the user is free to move as normal; when this volatility suddenly changes or disappears, it could be a sign of an irregularity. As such, the system may ensure that the wallet holder's funds are properly cared for upon making a determination that the owner of cryptographic assets may be incapacitated or under duress based on this technical data, in a way that is not feasible currently without the use of self-executing code, and may take an action, such as transferring cryptographic assets through a blockchain network.

The system may be used to allow automatic handling of cryptographic assets in the event that they are not accessible by their owners, for example during natural catastrophes.

As referred to herein, "tracked data" may include any information about a user or other entity that includes time-resolved data. In some embodiments, tracked data may comprise, for example, data usage on a device over time. In some embodiments, tracked data may include movement data, such as a user's position and inertial measurement data, over time. For example, the tracked data may comprise global positioning system (GPS) longitudinal and latitudinal coordinates over time, or may refer to inertial measurements from an inertial measurement unit, including a device's specific force, angular rate, or orientation from an accelerometer, a gyroscope or magnetometer data accumulated over time. Thus, tracked data may include measurement of rotational, linear and gravitational forces.

As referred to herein, "mobile device data" may include any information about a user derived from a mobile device. In some embodiments, mobile device data may include a user's position and inertial measurement data, or may include user profile data of a user's habits over a longer period of time; for example, average time spent abroad based on information derived from a mobile device's GPS data. In some embodiments, mobile phone data may include information derived from a smartphone, cellular phone, tablet or laptop. In some embodiments, mobile phone data may include call logs, internet browsing history or other activity taking place on mobile devices.

As referred to herein, an "irregularity" may include any event, action or occurrence that does not occur ordinarily. In some embodiments, an irregularity may comprise a natural disaster, for example, a hurricane, tornado or earthquake. In some embodiments, an irregularity may comprise a local or global tragedy, such as a war, battle or civil unrest. In some embodiments, an irregularity may comprise a crime experienced, such as a kidnapping or a robbery. In some embodiments, an irregularity may comprise a personal tragedy or disaster, such as getting stuck on a mountain while hiking due to a serious injury.

As referred to herein, a "cryptographic asset" may include any transferable digital representation that is designed in a way that prohibits their copying or duplication. For example, a cryptographic asset may comprise one or many cryptocurrency tokens, non-fungible tokens, or a security token. Cryptographic assets may be contained in cryptographic storage applications, such as in cryptographic wallets, which may comprise private keys. A cryptographic asset may not be transferrable without a blockchain transaction, and may require access to a wallet's private keys. A cryptographic asset may not be intrinsically transferrable to another entity upon their incapacitation.

Figure 2:
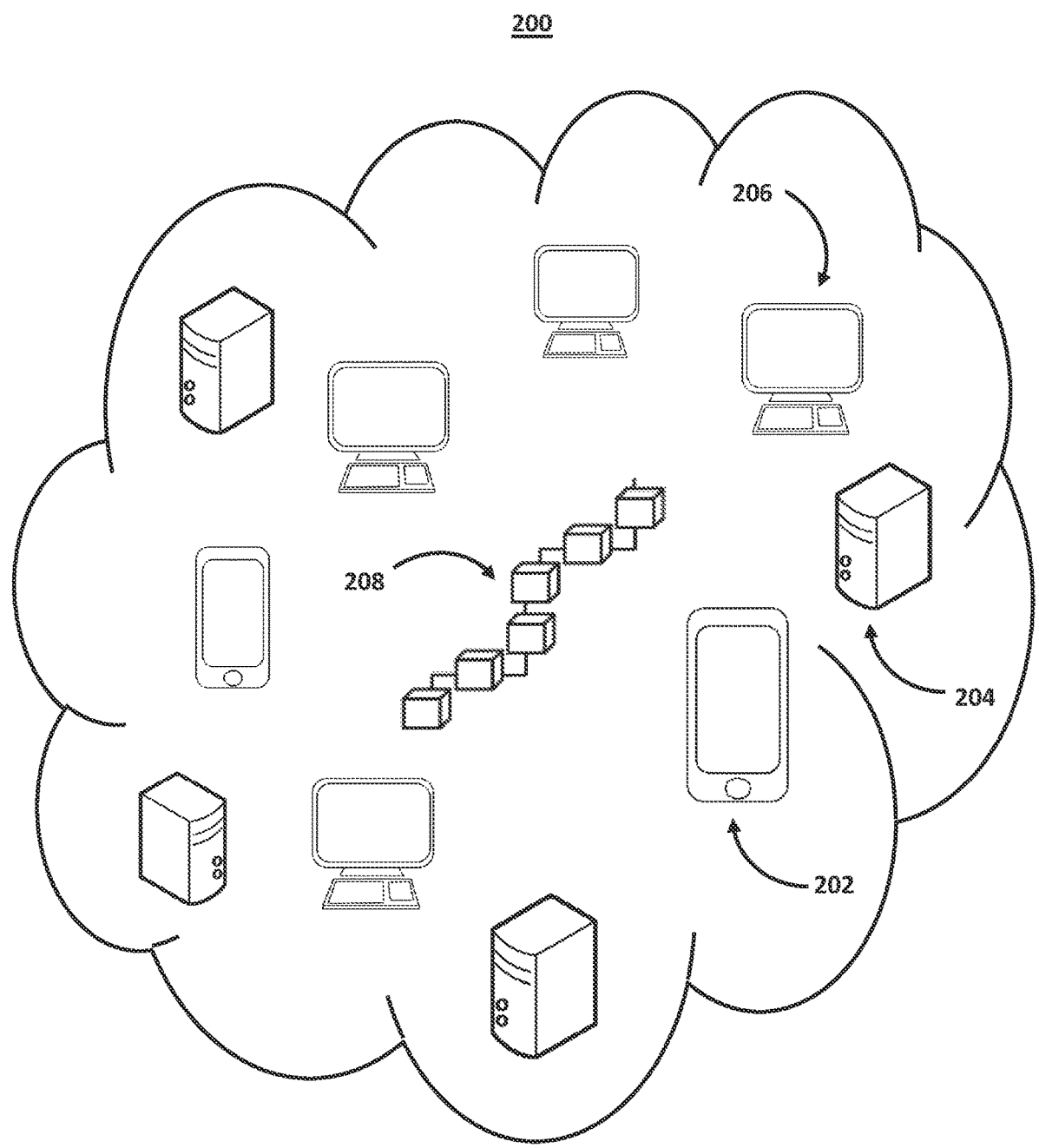
FIG. 2 shows an illustrative diagram for a decentralized environment for performing blockchain functions, in accordance with one or more embodiments.

FIG. 2 shows an illustrative diagram for a decentralized environment for performing blockchain functions, in accordance with one or more embodiments. For example, the diagram presents various components that may be used to transfer cryptographic resources out of a wallet to a receiver cryptographic storage application upon determination of an irregularity through self-executing code, in some embodiments.

As shown in FIG. 2, system 200 may include multiple user devices or mobile devices (e.g., user device 202, user device 202, and/or user device 206). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, mobile device and a server in FIG. 2, the user devices may be any type of computing device or mobile device, including, but not limited to, a laptop computer, a tablet computer, a hand-held computer, and/or other computing equipment (e.g., a server), including "smart," wireless, wearable, and/or mobile devices. It should be noted that, embodiments describing system 200 performing a blockchain function may equally be applied to, and correspond to, an individual user device (e.g., user device 202, user device 204, and/or user device 206) performing the blockchain function. That is, system 200 may correspond to the user devices (e.g., user device 202, user device 204, and/or user device 206) collectively or individually.

Each of the user devices may be used by the system to conduct blockchain functions and/or contribute to transferring cryptographic resources out of a wallet to a receiver cryptographic storage application upon determination of an irregularity through self-executing code. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that, is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas for the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet, which may be a type of cryptographic storage application (e.g., a digital wallet on user device 204), used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 2, one or more user devices may include a private key and/or a digital signature. For example, system 200 may use cryptographic systems for conducting blockchain functions, causing a cryptographic resource to be committed to a blockchain upon determining that a device's movement dataset is not consistent with the user profile dataset. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing blockchain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine that the blockchain function is valid. In response to validation of the block, a node user device (e.g., user device 202, user device 204, and/or user device 206) in the community network a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

FIG. 2 additionally depicts a system for retrieving movement data, user profile data and comparing the two datasets in order to determine whether to execute an action, in accordance with one or more embodiments. The system may, for example, retrieve locational information, as well as inertial information, from a device, as well as a user profile, which may include information about a device's regular usage and behavior. By leveraging a smart-contract to compare time-series of this locational and inertial data with the user profile, the system may make a determination about whether cryptographic resources should be handled, for example, transferred out of a wallet and committed to a blockchain. By doing so, the system may allow cryptographic assets to be accessible, even if the asset-holders are determined to be incapacitated in some way based on this locational and inertial data. This process differs from conventional cryptoassets, where access is strictly controlled by cryptographic barriers, such as the requirement for a private key before a blockchain-controlled transfer of assets is made, which may make the incapacitation of a cryptowallet holder fatal with regard to accessing the cryptoassets.

As described herein, a "time-series" may include a sequence of data points that occur in successive order over some period of time. In some embodiments, time-series data may be contrasted with cross-sectional data, which captures a point-in-time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time series analysis. For example, a time series analysis may be useful to see how a given asset, security, or economic variable changes over time. It can also be used to examine how the changes associated with the chosen data point compare to shifts in other variables over the same time period. For example, with regards to retail loss, the system may receive time series data for the various sub-segments indicating daily values for theft, product returns, etc.

The time-series analysis may determine various trends such as a secular trend, which describe the movement along the term, a seasonal variation, which represent seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data which may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices. Thus, normalization may lead to lower model performance and more model errors. The use of anon-parametric bias test alleviates the need for normalization, while still allowing the methods and systems to determine a respective proportion of error detection for each of the plurality of time-series data component models. Through this unconventional arrangement and architecture, the limitations of the conventional systems are overcome. For example, non-parametric bias tests are robust to irregular distributions, while providing an allowance for covariate adjustment, Since no distributional assumptions are made, these tests may be applied to data that has been processed under any normalization strategy or not processed under a normalization process at all.

The system may use a cryptographic resource. As referred to herein, a "cryptographic resource" may include any asset, feature or element that may be a transferrable digital representation. In some embodiments, cryptographic assets may be designed in a way that prohibits their copying or duplication, and may include cryptocurrency reserves. In some embodiments, cryptographic assets may comprise non-fungible tokens, or security tokens, such as a token that represents a car's vehicle identification number. Cryptographic resources, in particular, cannot conventionally be transferred after, for example, the death of an owner of these resources, without access to a resource's cryptographic security keys, such as private keys in the case of asymmetrically encrypted cryptographic resources. Thus, by leveraging use of a self-executing code, the system may allow assets to be handled in case of incapacitation of the asset's owners upon determining that a condition is satisfied by comparing user profile data and a movement dataset, thus solving the technical problem created by the possession of cryptographic resources in case of catastrophes and other irregular events.

The system may use cryptographic storage applications. As referred to herein, cryptographic storage applications are any type of application, software or program that allows for the storage of cryptographic resources. In some embodiments, a cryptographic storage application may comprise a cryptowallet, for example, which may comprise cryptocurrencies, security tokens and/or non-fungible tokens. In some embodiments, cryptographic storage applications may have an address associated with them, known as a cryptographic storage application address, which may comprise an alphanumeric string that is allocated on a blockchain network. In some embodiments, the cryptographic storage application address may correspond to the cryptographic storage application's public key. In some embodiments, the cryptographic storage application may comprise a private key. In some embodiments, the cryptographic storage application may be accessible via a blockchain network. By utilizing cryptographic storage applications and their related security features, cryptographic assets may not only be stored securely, but they may also be transferred securely using, in some embodiments, asymmetric encryption, such as an elliptic curve digital signatures encryption algorithm. Thus, transferring the contents of cryptographic storage applications may be difficult if the owner of the relevant cryptographic security keys, such as the cryptographic storage application address and respective private key, is incapacitated in some way. Thus, leveraging a smart-contract or self-executing code to detect and subsequently handle situations where access to a cryptographic storage application may be lost is paramount to ensuring the continued existence and accessibility of the assets stored within.

The system may use private keys. As referred to herein, a "private key" may refer to a variable in cryptography that is used to encrypt or sign data. A private key may be associated with a particular cryptographic storage application or a digital wallet in some embodiments. In some embodiments, a private key may comprise an alphanumeric string. In some embodiments, a private key may comprise a 256-bit number and may be associated with a public key via an elliptic curve digital signature algorithm. By design, if a user loses a private key, it may be impossible to access the corresponding cryptographic storage application or wallet for spending, withdrawal or transfer of assets; it is for this reason a mechanism for accessing funds is necessary in situations where the normal party with access to a cryptographic storage application may be incapacitated or in danger in any way. Use of the private key also allows cryptoassets to be transferred securely to another cryptographic storage application, which may be an action executed upon a determination of an irregularity in order to protect the assets.

The system may use public keys. As referred to herein, a "public key" is a cryptographic code that may allow users to receive cryptographic resources. In some embodiments, a public key may comprise a string of alphanumeric characters, and may be associated with a particular cryptographic storage application or a digital wallet. In some embodiments, a public key may be associated with a corresponding private key, for example through an encryption algorithm such as an elliptic curve digital signature algorithm. A public key may correspond to a cryptographic storage application address. Use of another user's public key, for example a "receiver" public key, may allow cryptographic assets or resources to be transferred to the correct destination securely.

The system may use self-executing code. As referred to herein, a "self-executing code" may comprise any computer code, program or process that may run in response to satisfied conditions, without necessary input from a particular user or entity. For example, self-executing code may comprise a smart contract, or any self-executing contract, written into code. The self-executing code may exist across a distributed, decentralized blockchain network. Smart contracts permit transactions and agreements to occur without the need for a central authority, legal system, or external enforcement mechanism; thus, in the absence of legal or procedural backstops for handling cryptographic resources, as is currently the case, smart contracts and self-executing code provide effective ways to determine and handle events as they occur. In some embodiments, a self-executing code allows for retrieval of a movement dataset, a user profile dataset, and a subsequent comparison between the two, before a determination to execute an action in response to the comparison. By relying on self-executing code, a user's cryptographic resources may be handled and protected even in the event that the user is incapacitated, where no user input would be necessary or indeed possible.

The system may use movement datasets. As referred to herein, a "movement dataset" may refer to any data that describes, comprises or illustrates a user's or device's movements. In some embodiments, a movement dataset may comprise locational data and inertial data. In some embodiments, a movement dataset may comprise transport data, such as flight or rail ticket information or vehicle trip computer information. In some embodiments, a movement dataset may comprise velocity or acceleration information, such as from speed cameras, radars, accelerometers, gyroscopes or other sensors. The movement dataset may comprise a dataset update frequency, which may refer to a frequency at which the dataset is updated with respect to time. The system may, subsequently, calculate an average dataset update frequency. By taking advantage of movement information, the system may make a determination as to the status of a user more effectively, and may compare this information with a user's regular behavior. By doing so, the system may leverage a smart contract and automatically detect when a user's cryptographic assets or resources may be in danger, for example, and subsequently act in time to protect the assets.

The system may use locational datasets. As referred to herein, a "locational dataset" may refer to any data related to a user's or device's location. In some embodiments, locational data may comprise global positioning system data. In some embodiments, locational data may comprise coordinates, for example longitude and latitude, and in some cases these coordinates may be derived from global positioning system data. In some embodiments, this global positioning data may be a time-series. In some embodiments, locational datasets may comprise time-series data related to a user's location. In some embodiments, locational data may comprise street addresses or postal codes, such as ZIP codes. By incorporating locational datasets, a system may make a determination regarding whether a user is moving in their normal manner and locations, or whether they are travelling outside of a normal range. In this case, the system may make a determination that this locational dataset is inconsistent with the user's quotidian user profile and, in response, execute an action in order to protect the user's cryptographic resources.

The system may make use of inertial datasets. As referred to herein, an "inertial dataset" may refer to any data related to a user's or device's forces, or any other type of inertial data. Inertial datasets may comprise information from inertial measurement units over time, known as an inertial measurement unit time-series, about the specific force, angular rate and/or orientation of a body, and may comprise an accelerometer, magnetometer and/or gyroscope. An inertial measurement unit, and its respective data, may contain information about pitch, roll and yaw for a given device or body. By incorporating inertial datasets, locational datasets are supplemented with information about the forces acting on a device. This extra information may provide clues about, for example, the type of vehicle a user may be in, as different vehicles accelerate differently. It may also provide information about, for example, the altitude of a device based on changes in gravitation, and may also supplement global positioning system data in providing locational data in cases where global positioning system data is unavailable, such as in tunnels or other places where GPS signals do not reach. Thus, by including this information, the system may more effectively make a determination about the status of a user, and whether the user is behaving in a way similar to the user profile or not. By making this determination, the system may decide to execute an action to protect the user's cryptographic assets or resources if necessary.

The system may use user profile datasets. As referred to herein, a "user profile dataset" may comprise data regarding a user's or device's actions, characteristics or behaviors. In some embodiments, a user profile dataset may include information about a user's home, or more generally their most commonly visited locations. In some embodiments, a user profile dataset may include information about a user's biometric data, such as their name, their occupation, their workplace, their age, their address history, their educational attainment, and their citizenship. A user profile dataset may comprise information about a user's location and inertial data over a period of time, which may in some embodiments be a greater period of time than for locational and inertial datasets. A user profile dataset may include averages of the aforementioned data types. A user profile may also include requirements or special circumstances where a user may believe that they may be in danger, such as particular locations that the user would like to avoid, or particular time-periods in which a user must be reachable. By including a user profile, a smart contract or self-executing code may have access to information regarding a user's desired or normal behavior. If any deviations from this behavior are observed, the system may, in response, execute an action specified by the self-executing code, which may include transferring cryptographic assets to another cryptographic storage application in order to protect them. Thus, including user profile information is crucial to allowing cryptographic assets or resources to be handled upon a user's incapacitation, for example.

The system may use a threshold global positioning system deviation. As referred to herein, a "threshold global positioning system deviation" may comprise a value or a condition relating to a global positioning system data deviation from a user profile. This condition may be a range of longitude and latitude coordinates, in some embodiments for example, beyond which an irregularity is detected. The system may determine a threshold global positioning system deviation, for example, through a machine learning model from user profile data, whereby the machine learning model may calculate a probability that a user may deviate from their user profile global positioning system data by a certain amount and determine a threshold global positioning system deviation accordingly. The system may also leverage a stationary time threshold, which may comprise a threshold elapsed time where a user appears to be stationary or irregularly moving or located in any other manner. This stationary time threshold may also be derived from user profile data, for example using a machine learning model. By determining a threshold global positioning system deviation, or a stationary time threshold, the system may better determine whether a user is acting in a desired manner and, in response, whether to execute an action to protect or handle the user's cryptographic resources stored in their cryptographic storage application.

The system may utilize a threshold inertial measurement unit deviation. As referred to herein, a "threshold inertial measurement unit deviation" may comprise a value or a condition relating to an inertial measurement unit data deviation from a user profile. This condition may be a range of gyroscopic, accelerometric or any other force-related values or conditions, in some embodiments for example, beyond which an irregularity is detected. The system may determine a threshold inertial measurement unit deviation, for example, through a machine learning model from user profile data, whereby the machine learning model may calculate a probability that a user may deviate from their user profile inertial measurement data by a certain amount and determine a threshold inertial measurement unit deviation accordingly. The system may also leverage a stationary time threshold, which may comprise a threshold elapsed time where a user appears to be stationary or irregularly moving or located in any other manner. This stationary time threshold may also be derived from user profile data, for example using a machine learning model. By determining a threshold inertial measurement unit deviation, or a stationary time threshold, the system may better determine whether a user is acting in a desired manner and, in response, whether to execute an action to protect or handle the user's cryptographic resources stored in their cryptographic storage application.

The system may use a threshold dataset update frequency. As referred to herein, a "threshold dataset update frequency" may comprise a value or a condition relating to a dataset update frequency from a user profile. In some embodiments, the condition may be related to a range of frequencies or periods of time where a user's data in their user profile is updated, for example, beyond which an irregularity is detected. In some embodiments, the system may determine a threshold inertial measurement unit deviation, for example, through a machine learning model from user profile data, whereby the machine learning model may calculate a probability that a user's average dataset update frequency may deviate from their user profile-based dataset update frequency by a certain amount, and decide a threshold dataset update frequency accordingly. By determining a threshold dataset update frequency, the system may better determine whether a user or their device is acting in a desired or normal manner and, in response, whether to execute an action to protect or handle the user's cryptographic resources stored in their cryptographic storage application.

The system may use an off-chain oracle. As referred to herein, an "off-chain oracle" may comprise a device or an entity that connects blockchains to external systems. In some embodiments, an off-chain oracle may utilize an external transaction, for example through an application programming interface, to enter data input into a blockchain. In some embodiments, the off-chain oracle may operate in a decentralized network, where every independent node of the oracle network may independently retrieve data from an off-chain source to place it on-chain. In some embodiments, the off-chain oracle may accept requests for datasets, for example the first movement dataset, as well as an address, such as the cryptographic storage application address, to send the dataset. By handling the requests for movement data, the off-chain oracle allows the self-executing code and associated blockchain to receive data about the user, and enables the comparison between the user profile and movement dataset, without which it would be impossible to determine whether a user is incapacitated.

Figure 3:
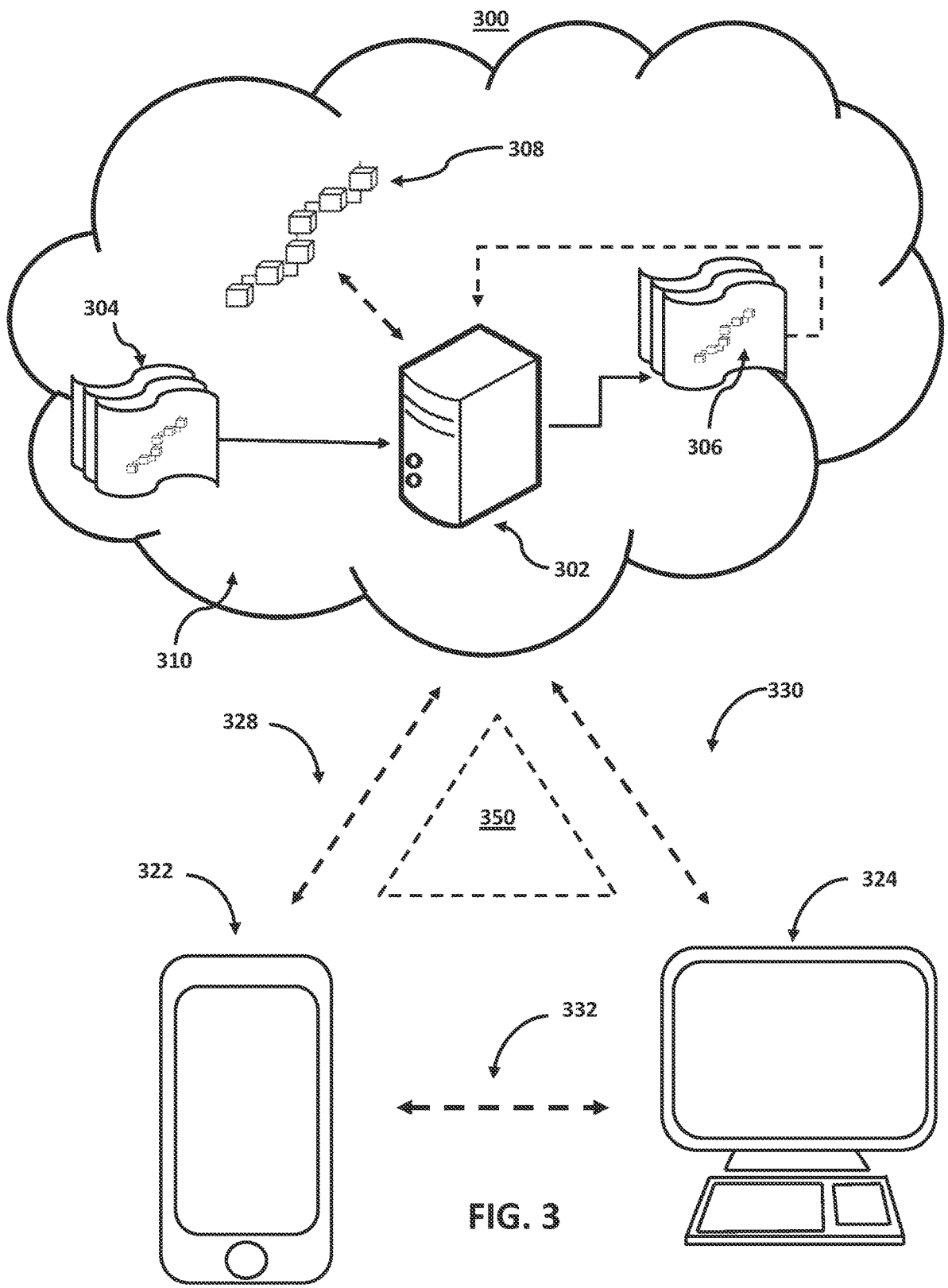
FIG. 3 shows illustrative components for a system used to distribute cryptographic resources upon determination of an irregularity, in accordance with one or more embodiments.

FIG. 3 shows illustrative components for a system used to distribute cryptographic resources upon determination of an irregularity, in accordance with one or more embodiments. For example, FIG. 3 may show illustrative components for transferring cryptographic assets, such as cryptocurrencies, to another cryptographic storage application by causing the resources to be committed to a blockchain. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively the any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the paths. The control circuitry may comprise any suitable processing, storage, and/or I/O circuitry. Each of these devices may also include a user input interface and/or user output interface a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communication networks or combinations of communication networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include movement datasets, which may comprise global positioning system time-series, inertial measurement unit time-series or any other data that may describe, comprise or illustrate a user's movements. Cloud components 310 may, in some embodiments, include user profile datasets, which may comprise data regarding a user's actions, characteristics or behaviors. Cloud components 310 may, in some embodiments, include off-chain oracles, which may comprise a device or an entity that connects blockchains to external systems.

Cloud components 310 may access blockchain network 308 (e.g., which in some embodiments may correspond to blockchain 208 (FIG. 2)). Additionally, cloud components 310 may access movement datasets, global positioning system time-series, inertial measurement unit time-series or user profile datasets from external devices.

Cloud components 310 may include model 302, which may be a machine learning model, artificial intelligence model, deep learning model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., prediction of a threshold locational/GPS or inertial measurement unit deviation, or a threshold dataset update frequency).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may, have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether an input or data is considered to be regular or irregular behavior).

In some embodiments, the model (e.g., model 302) may automatically perform actions based on outputs 306. In some embodiments, the model (e.g., model 302) may not perform any actions. The output of the model (e.g., model 302) may be used to execute an action relating to a cryptographic storage application and any cryptographic resources stored within. For example, the output of the model (e.g., model 302) may be used to compare the user profile dataset with the movement dataset, and determine whether to transfer cryptographic resources to another cryptographic storage application.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
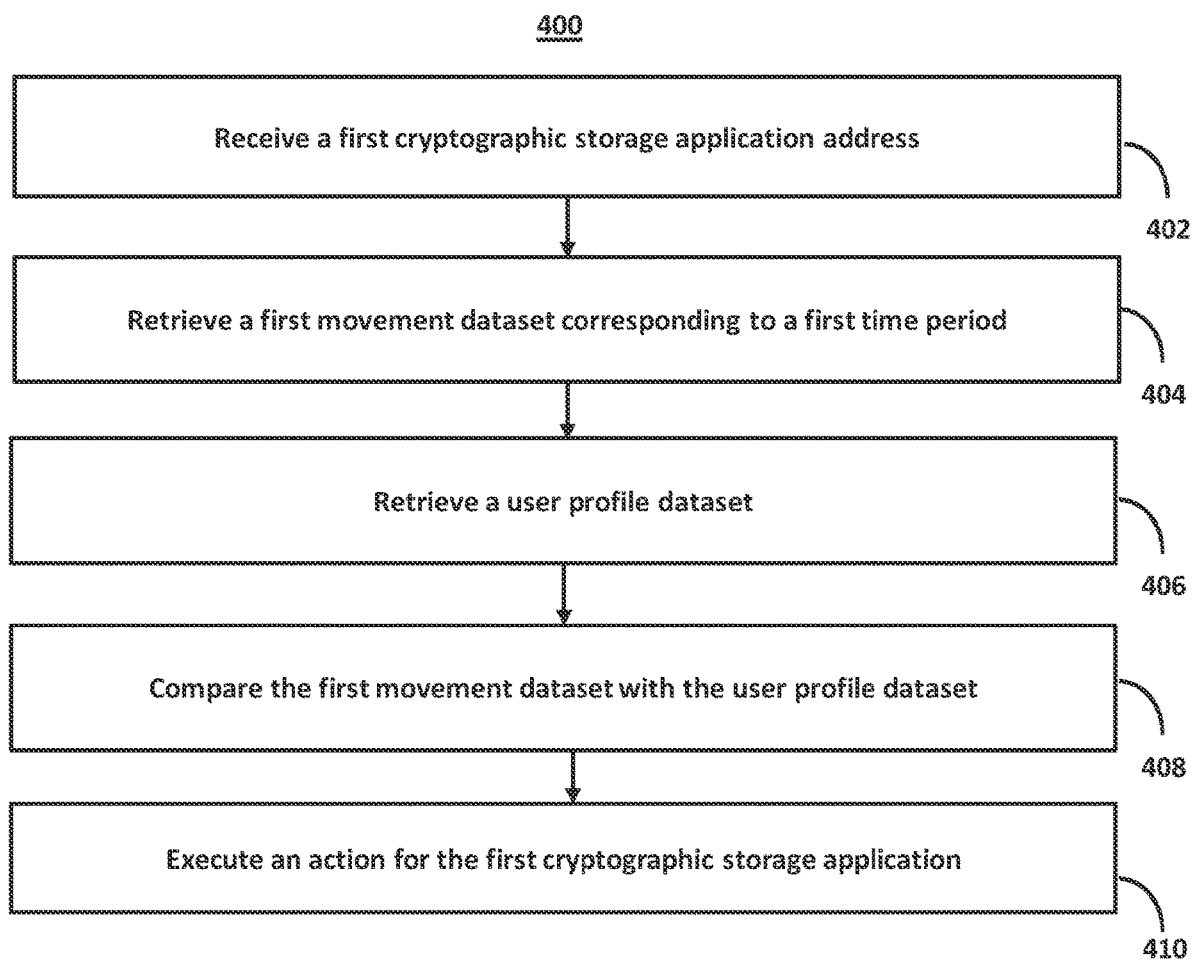
FIG. 4 shows a flowchart of the steps involved in distributing cryptographic resources upon determination of an irregularity, in accordance with one or more embodiments.

FIG. 4 shows a flowchart of the steps involved in distributing cryptographic resources upon determination of an irregularity, in accordance with one or more embodiments. For example, the system may use process 400 (e.g., as implemented on one or more system components described above) in order to protect cryptographic assets in the case of incapacitation of a primary, cryptowallet holder.

At step 402, process 400 (e.g., using one or more components described above) may cause the system to receive a first cryptographic storage application address. For example, the system may receive, at a first device in a computer network, a first cryptographic storage application address, wherein the first device comprises a self-executing code, wherein the first cryptographic storage application address corresponds to a first cryptographic storage application, and wherein the first cryptographic storage application enables access to a first cryptographic resource. For example, the system may receive the wallet address of the holder of a cryptographic wallet that may contain a cryptographic: resource, such as a cryptocurrency. By doing so, the self-executing code, or the smart-contract, for example, is able to determine which user's cryptographic resources to handle and protect, upon the determination of an irregularity in the user's movement dataset.

At step 404, process 400 (e.g., using one or more components described above) may retrieve a first movement dataset corresponding to a first time period. For example, the system may retrieve, at the first device, a first movement dataset corresponding to a first time period, wherein the first movement dataset comprises a first locational dataset and a first inertial dataset. The system may retrieve, for example, data containing information about a user's location or mode of transportation, as well as forces acting on the user. By doing so, the system may collect information about the user's current physical status, which is crucial information for determining whether the user may be incapacitated or in danger. Based on this determination, this information regarding the person's movement allows the self-executing code to execute an action in order to protect a user's cryptographic resources.

In some embodiments, the system may retrieve the movement dataset by transmitting a request for a global positioning time-series and receiving this global positioning time-series. For example, the system may transmit a request for a first global positioning system time-series over the first time period, and receive the first global positioning system time-series over the first time period as the first locational dataset. In some embodiments, the movement dataset may include global positioning system data over time, such as latitudinal and longitudinal coordinates, for which a request may be transmitted to a user's device and received. This granular locational data regarding a user's GPS coordinates may provide information regarding the user's whereabouts and, thus, allows the self-executing code to better determine the circumstances and situations surrounding the user as compared to the user's normal behavior. As GPS data is widely available in mobile devices, this data may also be automatically collected by devices, which improves the consistency of information retrieved by the system.

In some embodiments, the system may retrieve the movement dataset by transmitting a request, for inertial measurement unit, time-series and receiving this inertial measurement unit time-series. For example, the system may transmit a request for a first inertial measurement unit time-series over the first time period and receive, from a second device in the computer network at the first device, the first inertial measurement unit time-series over the first time period as the first inertial dataset. In some embodiments, the movement dataset may include inertial measurement unit data over time, such as force, gyroscopic, accelerometric and orientational data, for which a request may be transmitted to a user's device and received. This granular inertial data regarding a user's forces may provide information about, for example, the mode of transport or other experiences that the user may be having and, thus, provides additional context to determine the circumstances and situations surrounding the user as compared to the user's normal behavior. As inertial measurement units are widely available in mobile devices, this data may also be automatically collected by devices, which improves the consistency of information retrieved by the system.

In some embodiments, the system may retrieve the movement dataset by transmitting a request to an off-chain oracle and subsequently receiving the movement dataset. For example, the system may transmit, from the first device to a first off-chain oracle, a request for the first movement dataset, wherein the request for the first movement dataset comprises the first cryptographic storage application address and receives, at the first device from the first off-chain oracle, the first movement dataset. The system may request that an off-chain oracle send, to a particular address, the dataset corresponding to a user or a device, as the blockchain itself cannot access external data sources; this process may include the use of inbound, outbound, hardware or software oracles. By including an oracle, the system may interface with and receive data from external sources of data, such as from mobile phone GPS sensors and inertial measurement units, which enables the self-executing code to incorporate enough data to compare with the user profile dataset, and make a determination to execute an action to, for example, protect the user's cryptographic assets.

At step 406, process 400 (e.g., using one or more components described above) may, retrieve a user profile dataset. For example, the system may retrieve, at the first device, a user profile dataset. The user profile dataset may comprise any information that may contribute to whether to execute an action with regard to a user's cryptographic assets. By incorporating a user dataset, which may include for example biometric data or other user characteristics, the system may better compare a user's characteristics with the positional and inertial datasets, in some embodiments through machine learning models, for example. This user dataset, thus, enables the system to better determine circumstances or situations where a user, based on the user profile and characteristics, may be in danger, incapacitated or otherwise may lose access to cryptographic assets, and may allow the self-executing code to execute an action to mitigate the effects of any, incapacitation accordingly.

In some embodiments, the user profile dataset may comprise long-term GPS time-series data and long-term inertial measurement data. For example, the system may retrieve, at the first device, a user profile dataset, wherein the user profile dataset comprises a long-term global positioning system time-series and a long-term inertial measurement unit time-series, wherein the long-term global positioning system time-series and the long-term inertial measurement unit time-series corresponds to a second time period longer than the first time period. The system may, then, retrieve information corresponding to long-term behaviors (both in terms of positron; location and in terms of forces acting on the user's device), in order to better determine whether there are any discrepancies between the user's current location or inertial data, and the user's customary location or inertial data information. Thus, by retrieving this long-term user profile dataset, the system may better characterize whether the circumstances surrounding the user are out of the ordinary or not through comparison with the movement dataset, and thereby, in response to this comparison, execute an action in order to protect the user's cryptographic assets, for example.

At step 408, process 400 (e.g., using one or more components described above) may compare the first movement dataset with the user profile dataset. The system may compare, for example, the global positioning system time-series and the inertial measurement unit time-series with, for example, the corresponding data from the user-profile. In some embodiments, the comparison may be done through a machine learning algorithm, which could determine whether the set of circumstances is sufficiently improbable to trigger an action to be executed. By doing so, the system may determine whether the current situation of a user, based on their user profile and movement datasets, has changed and, if so, whether to take further action in order to protect the user's assets. By comparing the two datasets, the system is leveraging past information about the individual, embodied in the user profile, to evaluate new data, corresponding to the movement dataset, which allows the system to more accurately determine when to execute the action and, for example, transfer a user's cryptographic assets out of a cryptographic storage application.

In some embodiments, comparing the first movement dataset with the user profile dataset comprises determining a threshold GPS deviation, a stationary time threshold, and determining that the corresponding time-series varies less than the threshold values. For example, the system may determine a first threshold global positioning system deviation and a first stationary time threshold, using the user profile dataset, and may determine that the first global positioning system time-series varies less than the first threshold global positioning system deviation for greater than the first stationary time threshold. The system may use the user profile dataset to determine a threshold value for a deviation of a GPS signal; for example, a threshold for, if the user has not moved more than a specified threshold value for a specified threshold stationary time, the system may determine that it may execute an action to protect a user's cryptographic assets. This determination may be made by, for example, using a machine learning model with the user profile dataset as an input, in order to decide what constitutes an irregular movement pattern. Thus, by analyzing the user profile, a threshold GPS deviation and a threshold stationary time may be derived, in order to allow a comparison to be made with the user's global positioning system time-series, in order to accurately determine when to execute the action to mitigate, for example, cryptographic asset loss upon user incapacitation.

In some embodiments, comparing the first movement dataset with the user profile dataset comprises determining a threshold inertial measurement unit deviation, a stationary time threshold, and determining that the corresponding time-series varies less than the threshold values. For example, the system may determine a first threshold inertial measurement unit deviation and a first stationary time threshold, using the user profile dataset, and may determine that the first inertial measurement unit time-series varies less than the first threshold inertial measurement unit deviation for greater than the first stationary time threshold. The system may use the user profile dataset to determine a threshold value for a deviation of an inertial measurement unit signal; for example, if the user has not moved more than a specified threshold value for a specified threshold stationary time, the system may determine that it may execute an action to protect a user's cryptographic assets, as it may determine that the user has moved an uncharacteristically small amount over a long period of time. This step provides additional information over the GPS data, as it also incorporates sensitive movements that may cause small forces on the user's device. If the user is completely paralyzed, for example, the inertial measurement unit will accurately capture that no forces are acting on the device. This determination may be made by, for example, using a machine learning model with the user profile dataset as an input, in order to decide what constitutes an irregular movement pattern. Thus, by analyzing the user profile, a threshold inertial measurement unit deviation and a threshold stationary time may be derived, in order to allow a comparison to be made with the user's inertial measurement unit system time-series, in order to accurately determine when to execute the action to mitigate, for example, cryptographic asset loss upon user incapacitation.

In some embodiments, comparing the first movement dataset with the user profile dataset comprises determining a threshold dataset update frequency from the user profile, calculating an average dataset update frequency, and comparing the two. For example, the system may determine a first threshold dataset update frequency from the user profile dataset, may calculate a first average dataset update frequency from the first movement dataset, and may determine that the first average dataset update frequency is lower than the first threshold dataset update frequency. The system may compare the normal frequency at which the device may send updates about its data, position or inertial measurements in its user profile with the actual frequency at which the data is being updated and may, as a result, determine that the mobile device is non-functional, for example. Based on this determination, the system may be configured to execute an action. Thus, by analyzing the user profile for information about the update frequency, and determining a threshold, perhaps based on a machine learning model with the user profile as an input, the system may more accurately determine when the user may be incapacitated, for example in situations where their phone may be destroyed. This step, then, allows the system to better handle a user's cryptographic assets, for example, by adding clues about the user's situation and status based on the frequency at which datasets are being updated.

At step 410, process 400 (e.g., using one or more components described above) may execute an action for the first cryptographic storage application. For example, the system may, in response to comparing the first movement dataset with the user profile dataset, execute an action for the first cryptographic storage application via the self-executing code. The system may take action after having decided that the user profile dataset is not consistent with the movement dataset. For example, the system may determine that the user's UPS coordinate data is inconsistent with their normal behavior through a machine learning model, using the user profile data as input, and in response may decide to execute an action in order to protect cryptographic assets. By executing an action, the self-executing code may take action upon determining, for example, that a user is incapacitated, without waiting for user input, allowing the system to benefit the user when they, may not have the agency to do so.

In some embodiments, executing an action for the cryptographic storage application may comprise transmitting cryptographic resources to another cryptographic storage application. For example, the system may transmit the first cryptographic resource to a first receiver cryptographic storage application, wherein transmitting the first cryptographic resource to the first receiver cryptographic storage application comprises signing a first cryptographic resource transmission with a first private key corresponding to the first cryptographic storage application, wherein the first cryptographic resource transmission comprises a first receiver public key corresponding to the first receiver cryptographic storage application and cause the first cryptographic resource transmission to be committed to a blockchain. In response to determining a difference between the movement dataset and the user profile dataset, the system may transfer the cryptographic assets or resources within one cryptowallet, for example, to another cryptowallet, using asymmetrical encryption in order to ensure the transaction is secure this asymmetrical encryption may be embodied in the use of a private key and a public key for the cryptowallet to which the cryptographic resources may be transferred. By leveraging a blockchain transaction for this transfer, the transfer may be secure and validated in a manner that maintains the integrity of the cryptographic assets. Executing these actions is especially important in that it provides a secure way to transfer these assets to another entity in case of incapacitation, for example, while still providing for the safety of the assets.

In some embodiments, executing an action for the cryptographic storage: application may comprise disabling access to the cryptographic resource. For example, the system may disable access to the first cryptographic resource in the first cryptographic storage application. In response to comparing the user dataset and the movement dataset and establishing an irregularity in the mobile device data, the system may subsequently freeze the assets of the user, for example, if the cryptographic assets are to be protected against an undesirable entity, by disabling access to the cryptographic storage application. Thus, the system may ensure that the cryptographic resources stored in, for example, the cryptowallet, are kept safe from others.

In some embodiments, the system may generate a warning in response to comparing the movement dataset with the user profile dataset. For example, the system may generate a warning for the first cryptographic storage application via the self-executing code, for display on a user interface at a second device in the computer network. The system may generate a warning display to the user upon detecting an irregularity or an emergency situation wherein the user may be incapacitated. Thus, the user may be forewarned as to any actions that may be taken by the system, for example, which allows the user to take any mitigating actions to get to safety if needed.

In some embodiments, the system may receive a request to disable the self-executing code and subsequently disable the self-executing code. For example, the system may receive a request to disable the self-executing code from the first device on the computer network. In response to receiving the request to disable the self-executing code, the system may disable the self-executing code. For example, the system may receive a request from the user to disable the code, as they may be planning a trip or an outing that is irregular, such that the system may otherwise determine that there is an irregularity in the user's actions. Thus, the system may receive a manual request to disable the code and prevent any actions from being taken upon receiving the user's movement data pre-emptively. This process could prevent accidentally distributing funds when no emergency situation, for example, is actually occurring.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood With reference to the following enumerated embodiments:

1. A method for distributing cryptographic resources to a receiver upon determination irregularity through self-executing code, the method comprising:
   receiving, at a first device in a computer network, a first cryptographic storage application address, wherein the first device comprises a self-executing code, wherein the first cryptographic storage application address corresponds to a first cryptographic storage application, and wherein the first cryptographic storage application enables access to a first cryptographic resource;
   retrieving, at the first device, a first movement dataset corresponding to a first time period, wherein the first movement dataset comprises a first locational dataset and a first inertial dataset;
   retrieving, at the first device, a user profile dataset;
   comparing the first movement dataset with the user profile dataset; and in response to comparing the first movement dataset with the user profile dataset, executing an action for the first cryptographic storage application via the self-executing code.

2. The method of any one of the preceding embodiments, wherein retrieving, at the first device, the first movement dataset comprises:
   transmitting a request for a first global positioning system time-series over the first time period; and
   receiving the first global positioning system time-series over the first time period as the first locational dataset.

3. The method of any one of the preceding embodiments, wherein comparing the first movement dataset with the user profile dataset comprises:
   determining a first threshold global positioning system deviation and a first stationary time threshold, using the user profile dataset; and
   determining that the first global positioning system time-series varies less than the first threshold global positioning system deviation for greater than the first stationary time threshold.

4. The method of any one of the preceding embodiments, wherein retrieving, at the first device, the first movement dataset comprises:
   transmitting a request for a first inertial measurement unit time-series over the first time period; and
   receiving, from a second device in the computer network at the first device, the first inertial measurement unit, time-series over the first time period as the first inertial dataset.

5. The method of any one of the preceding embodiments, wherein comparing the first movement dataset with the user profile dataset comprises:
   determining a first threshold inertial measurement unit deviation and a first stationary time threshold; and
   determining that the first inertial measurement unit time-series varies less than the first threshold inertial measurement unit deviation for greater than the first stationary time threshold.

6. The method of any one of the preceding embodiments, wherein comparing the first movement dataset with the user profile dataset comprises:
   determining a first threshold dataset update frequency from the user profile dataset;
   calculating a first average dataset update frequency from the first movement dataset; and
   determining that the first average dataset update frequency is lower than the first threshold dataset update frequency.

7. The method of any one of the preceding embodiments, wherein retrieving, at the first device, the first movement dataset comprises:
   transmitting, from the first device to a first off-chain oracle, a request for the first movement dataset, wherein the request for the first movement dataset comprises the first cryptographic storage application address; and
   receiving, at the first device from the first off-chain oracle, the first movement dataset.

8. The method of any one of the preceding embodiments, wherein executing the action for the first cryptographic storage application via the self-executing code comprises:
   transmitting the first cryptographic resource to a first receiver cryptographic storage application, wherein transmitting the first cryptographic resource to the first receiver cryptographic storage application comprises:
   signing a first cryptographic resource transmission with a first private key corresponding to the first cryptographic storage application, wherein the first cryptographic resource transmission comprises a first receiver public key corresponding to the first receiver cryptographic storage application; and
   causing the first cryptographic resource transmission to be committed to a blockchain.

9. The method of any one of the preceding embodiments, wherein executing the action for the first cryptographic storage application via the self-executing code comprises:
   disabling access to the first cryptographic resource in the first cryptographic storage application.

10. The method of any one of the preceding embodiments, wherein the method further comprises:
    receiving a request to disable the self-executing code from the first device on the computer network; and
    in response to receiving the request to disable the self-executing code, disabling the self-executing code.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for distributing cryptographic resources to a receiver upon determination of an irregularity through self-executing code, the system comprising:
   one or more processors; and
   a non-transitory, computer-readable medium comprising instructions that when executed by the one or more processors cause operations comprising:
     receiving, at a first device in a computer network, a first cryptographic storage application address, wherein the first device comprises a self-executing code, wherein the first cryptographic storage application address corresponds to a first cryptographic storage application, and wherein the first cryptographic storage application enables access to a first cryptographic resource in the first cryptographic storage application;
     retrieving, at the first device, a first movement dataset, wherein the first movement dataset comprises a first global positioning system time-series and a first inertial measurement unit time-series corresponding to a first time period;
     retrieving, at the first device, a user profile dataset, wherein the user profile dataset comprises a long-term global positioning system time-series and a long-term inertial measurement unit time-series, wherein the long-term global positioning system time-series and the long-term inertial measurement unit time-series corresponds to a second time period longer than the first time period;
     comparing the first movement dataset with the user profile dataset; and
     in response to comparing the first movement dataset with the user profile dataset:
       generating a warning for the first cryptographic storage application via the self-executing code, for display on a user interface at a second device in the computer network;

signing a first cryptographic resource transmission with a first private key corresponding to the first cryptographic storage application, wherein the first cryptographic resource transmission comprises a first receiver public key corresponding to a first receiver cryptographic storage application; and causing the first cryptographic resource transmission to be committed to a blockchain.

2. A method for distributing cryptographic resources to a receiver upon determination of an irregularity through self-executing code, the method comprising:

receiving, at a first device in a computer network, a first cryptographic storage application address, wherein the first device comprises a self-executing code, wherein the first cryptographic storage application address corresponds to a first cryptographic storage application, and wherein the first cryptographic storage application enables access to a first cryptographic resource;

retrieving, at the first device, a first movement dataset corresponding to a first time period, wherein the first movement dataset comprises a first locational dataset and a first inertial dataset;

comparing the first movement dataset with a user profile dataset comprising long-term locational data and long-term inertial data; and in response to comparing the first movement dataset with the user profile dataset, executing an action for the first cryptographic storage application via the self-executing code, wherein executing the action comprises:
signing a first cryptographic resource transmission with a first private key corresponding to the first cryptographic storage application, wherein the first cryptographic resource transmission comprises a first receiver public key corresponding to a first receiver cryptographic storage application; and causing the first cryptographic resource transmission to be committed to a blockchain.

3. The method of claim 2, wherein retrieving, at the first device, the first movement dataset comprises:

transmitting a request for a first global positioning system time-series over the first time period; and receiving the first global positioning system time-series over the first time period as the first locational dataset.

4. The method of claim 3, wherein comparing the first movement dataset with the user profile dataset comprises:

determining a first threshold global positioning system deviation and a first stationary time threshold, using the user profile dataset; and determining that the first global positioning system time-series varies less than the first threshold global positioning system deviation for greater than the first stationary time threshold.

5. The method of claim 2, wherein retrieving, at the first device, the first movement dataset comprises:

transmitting a request for a first inertial measurement unit time-series over the first time period; and receiving, from a second device in the computer network at the first device, the first inertial measurement unit time-series over the first time period as the first inertial dataset.

6. The method of claim 5, wherein comparing the first movement dataset with the user profile dataset comprises:

determining a first threshold inertial measurement unit deviation and a first stationary time threshold; and determining that the first inertial measurement unit time-series varies less than the first threshold inertial measurement unit deviation for greater than the first stationary time threshold.

7. The method of claim 2, wherein comparing the first movement dataset with the user profile dataset comprises:

determining a first threshold dataset update frequency from the user profile dataset;

calculating a first average dataset update frequency from the first movement dataset; and determining that the first average dataset update frequency is lower than the first threshold dataset update frequency.

8. The method of claim 2, wherein retrieving, at the first device, the first movement dataset comprises:

transmitting, from the first device to a first off-chain oracle, a request for the first movement dataset, wherein the request for the first movement dataset comprises the first cryptographic storage application address; and receiving, at the first device from the first off-chain oracle, the first movement dataset.

9. The method of claim 2, wherein executing the action for the first cryptographic storage application via the self-executing code comprises transmitting the first cryptographic resource to a first receiver cryptographic storage application.

10. The method of claim 2, wherein executing the action for the first cryptographic storage application via the self-executing code comprises:

disabling access to the first cryptographic resource in the first cryptographic storage application.

11. The method of claim 2, wherein the method further comprises:

receiving a request to disable the self-executing code from the first device on the computer network; and in response to receiving the request to disable the self-executing code, disabling the self-executing code.

12. A non-transitory, computer-readable medium comprising instructions that, when executed on one or more processors, causes operations comprising:

receiving, at a first device in a computer network, a first cryptographic storage application address, wherein the first device comprises a self-executing code, wherein the first cryptographic storage application address corresponds to a first cryptographic storage application, and wherein the first cryptographic storage application enables access to a first cryptographic resource;

retrieving, at the first device, a first movement dataset corresponding to a first time period, wherein the first movement dataset comprises a first locational dataset and a first inertial dataset;

comparing the first movement dataset with a user profile dataset comprising long-term locational data and long-term inertial data; and in response to comparing the first movement dataset with the user profile dataset, executing an action for the first cryptographic storage application via the self-executing code, wherein executing the action comprises:

signing a first cryptographic resource transmission with a first private key corresponding to the first cryptographic storage application, wherein the first cryptographic resource transmission comprises a first receiver public key corresponding to a first receiver cryptographic storage application; and causing the first cryptographic resource transmission to be committed to a blockchain.

13. The non-transitory, computer-readable medium of claim 12, wherein retrieving, at the first device, the first movement dataset comprises:
- transmitting a request for a first global positioning system time-series over the first time period; and
- receiving the first global positioning system time-series over the first time period as the first locational dataset.

14. The non-transitory, computer-readable medium of claim 13, wherein comparing the first movement dataset with the user profile dataset comprises:
- determining a first threshold global positioning system deviation and a first stationary time threshold, using the user profile dataset; and
- determining that the first global positioning system time-series varies less than the first threshold global positioning system deviation for greater than the first stationary time threshold.

15. The non-transitory, computer-readable medium of claim 12, wherein retrieving, at the first device, the first movement dataset comprises:
- transmitting a request for a first inertial measurement unit time-series over the first time period; and
- receiving, from a second device in the computer network at the first device, the first inertial measurement unit time-series over the first time period as the first inertial dataset.

16. The non-transitory, computer-readable medium of claim 15, wherein comparing the first movement dataset with the user profile dataset comprises:
- determining a first threshold inertial measurement unit deviation and a first stationary time threshold; and
- determining that the first inertial measurement unit time-series varies less than the first threshold inertial measurement unit deviation for greater than the first stationary time threshold.

17. The non-transitory, computer-readable medium of claim 12, wherein comparing the first movement dataset with the user profile dataset comprises:
- determining a first threshold dataset update frequency from the user profile dataset;
- calculating a first average dataset update frequency from the first movement dataset; and
- determining that the first average dataset update frequency is lower than the first threshold dataset update frequency.

18. The non-transitory, computer-readable medium of claim 12, wherein retrieving, at the first device, the first movement dataset comprises:
- transmitting, from the first device to a first off-chain oracle, a request for the first movement dataset, wherein the request for the first movement dataset comprises the first cryptographic storage application address; and
- receiving, at the first device from the first off-chain oracle, the first movement dataset.

19. The non-transitory, computer-readable medium of claim 12, wherein executing the action for the first cryptographic storage application via the self-executing code comprises transmitting the first cryptographic resource to a first receiver cryptographic storage application.

20. The non-transitory, computer-readable medium of claim 12, wherein the instructions cause operations further comprising:
- receiving a request to disable the self-executing code from the first device on the computer network; and
- in response to receiving the request to disable the self-executing code, disabling the self-executing code.

* * * * *